United States Patent
Nagai et al.

(10) Patent No.: US 6,527,323 B2
(45) Date of Patent: Mar. 4, 2003

(54) SUCTION PAD HAVING A PATTERNED ATTRACTING SURFACE

(75) Inventors: Shigekazu Nagai, Tokyo (JP); Masayoshi Yamamoto, Koshigaya (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/916,673

(22) Filed: Jul. 30, 2001

(65) Prior Publication Data

US 2002/0011735 A1 Jan. 31, 2002

(30) Foreign Application Priority Data

Jul. 31, 2000 (JP) ........................................ 2000-232370

(51) Int. Cl.$^7$ ................................................. B25J 15/06
(52) U.S. Cl. ................................................. 294/64.1
(58) Field of Search ........................ 294/64.1, 65, 902; 271/90, 94, 99, 103, 107; 414/627, 737; 901/40; 269/21

(56) References Cited

U.S. PATENT DOCUMENTS

| | | | | |
|---|---|---|---|---|
| 1,294,103 A | * | 2/1919 | Hitchcock | 294/64.1 |
| 2,850,279 A | * | 9/1958 | Stoothoff et al. | 294/64.1 |
| 2,853,333 A | * | 9/1958 | Littell | 294/64.1 |
| 3,152,828 A | * | 10/1964 | Lytle | 294/64.1 |
| 3,154,306 A | * | 10/1964 | Elliott et al. | 294/64.1 |
| 3,272,549 A | * | 9/1966 | Nisula | 294/64.1 |
| 3,612,044 A | * | 10/1971 | Gurrola | 4/559 |
| 3,656,794 A | * | 4/1972 | McCord | 294/64.1 |
| 3,743,340 A | * | 7/1973 | Williamann | 294/64.1 |
| 3,901,502 A | * | 8/1975 | Vits | 294/64.1 |
| 3,920,128 A | * | 11/1975 | Baker | 294/65 |
| 3,934,916 A | * | 1/1976 | Baker | 294/64.1 |
| 4,389,064 A | * | 6/1983 | Laverriere | 294/64.1 |
| 4,589,648 A | * | 5/1986 | Hancock | 294/64.1 |
| 4,600,229 A | * | 7/1986 | Oten | 294/64.1 |
| 4,749,219 A | * | 6/1988 | Bolle et al. | 294/64.1 |
| 4,852,926 A | * | 8/1989 | Littell | 294/64.1 |
| 5,033,730 A | * | 7/1991 | Davies et al. | 294/64.1 |
| 5,190,332 A | * | 3/1993 | Nagai et al. | 294/64.1 |
| 5,192,070 A | * | 3/1993 | Nagai et al. | 271/90 |
| 5,193,796 A | * | 3/1993 | Nagai et al. | 294/64.1 |
| 5,626,378 A | * | 5/1997 | Puhl et al. | 294/64.1 |
| 5,904,387 A | * | 5/1999 | Nagai et al. | 294/64.1 |
| 6,193,291 B1 | * | 2/2001 | Morroney | 294/64.1 |

FOREIGN PATENT DOCUMENTS

| | | | | |
|---|---|---|---|---|
| CH | 0374154 | * | 2/1964 | 294/64.1 |
| DE | 3510719 | * | 9/1986 | 294/64.1 |
| DE | 0269599 | * | 7/1989 | 294/64.1 |
| EP | 0302221 | * | 2/1989 | 294/64.1 |
| FR | 2547289 | * | 12/1984 | 294/64.1 |
| GB | 2248223 | * | 1/1992 | 294/64.1 |
| GB | 2253142 | * | 2/1992 | |
| JP | 0142756 | * | 12/1978 | 294/64.1 |
| JP | 0083180 | * | 3/1990 | 294/64.1 |
| JP | 3115025 | * | 5/1991 | 294/64.1 |
| JP | 403293237 | * | 12/1991 | 271/90 |
| JP | 406143176 | * | 5/1994 | 294/64.1 |
| JP | 407214489 | * | 8/1995 | |
| JP | 09-011172 | | 1/1997 | |
| JP | 2000153485 | * | 6/2000 | |

* cited by examiner

*Primary Examiner*—Christopher P. Ellis
*Assistant Examiner*—Paul T. Chin
(74) *Attorney, Agent, or Firm*—Paul A. Guss

(57) ABSTRACT

A skirt section has a plurality of substantially elliptic projections and a recessed portion formed on an attracting surface thereof. The skirt section is separated from each other by predetermined spacing distances along a circumferential direction of the skirt section on concentric circles. The recessed portion enables a fluid under the negative pressure to be supplied to the entire attracting surface except for the projections. Even if oil film or water droplet adheres to an attracted surface of a workpiece, the workpiece can reliably be attracted without causing a slip.

6 Claims, 10 Drawing Sheets

PRIOR ART

US 6,527,323 B2

1

SUCTION PAD HAVING A PATTERNED ATTRACTING SURFACE

BACKGROUND OF THE INVENTION

1. Field of the Invention

The present invention relates to a suction pad capable of attracting and transporting a workpiece.

2. Description of the Related Art

A vacuum cup (suction pad) has been hitherto used in order to attract and transport a workpiece under an action of a negative pressure. As shown in FIGS. 11 and 12, the conventional vacuum cup 1 comprises a main cup body 4 including a base section 2 and a skirt section 3 which are integrally formed with a flexible material such as rubber. The skirt section 3 has grooves 6, 7 provided on an attracting surface 5 thereof. The grooves 6 are formed in a circumferential direction of the skirt section 3 and the grooves 7 are formed to intersect the grooves 6 formed in the circumferential direction (see Japanese Laid-Open Patent Publication No. 9-11172).

With the conventional vacuum cup 1, if oil film or water droplet adheres to a surface of an attracted object, the oil film or the water droplet intervening between the skirt section 3 and the surface of the attracted object is wiped away by cutouts constituting the grooves 6 formed in the circumferential direction. The oil film or the water droplet is excluded after it is gathered toward a center of the main cup body 4 by the grooves 7 in a radial direction of the skirt section 3. The radial direction thereof intersects the grooves 6 in the circumferential direction. Accordingly, the vacuum cup 1 is supposed to hold the attracted object against being out of position and falling due to a slip thereof.

However, with the conventional vacuum cup 1, only the grooves 6, 7 formed by the cutouts function as an acting surface under the negative pressure in the skirt section 3 tightly contacting with the attracted object. Therefore, there is a problem that an attracting force under the negative pressure cannot be increased so much.

SUMMARY OF THE INVENTION

It is a general object of the present invention to provide a suction pad which can reliably hold a workpiece against falling off without causing a slip thereof by further increasing an attracting force under a negative pressure even if oil film or water droplet adheres to an attracted surface of the workpiece.

The above and other objects, features, and advantages of the present invention will become more apparent from the following description when taken in conjunction with the accompanying drawings in which a preferred embodiment of the present invention is shown by way of illustrative example.

2

Figure 1:
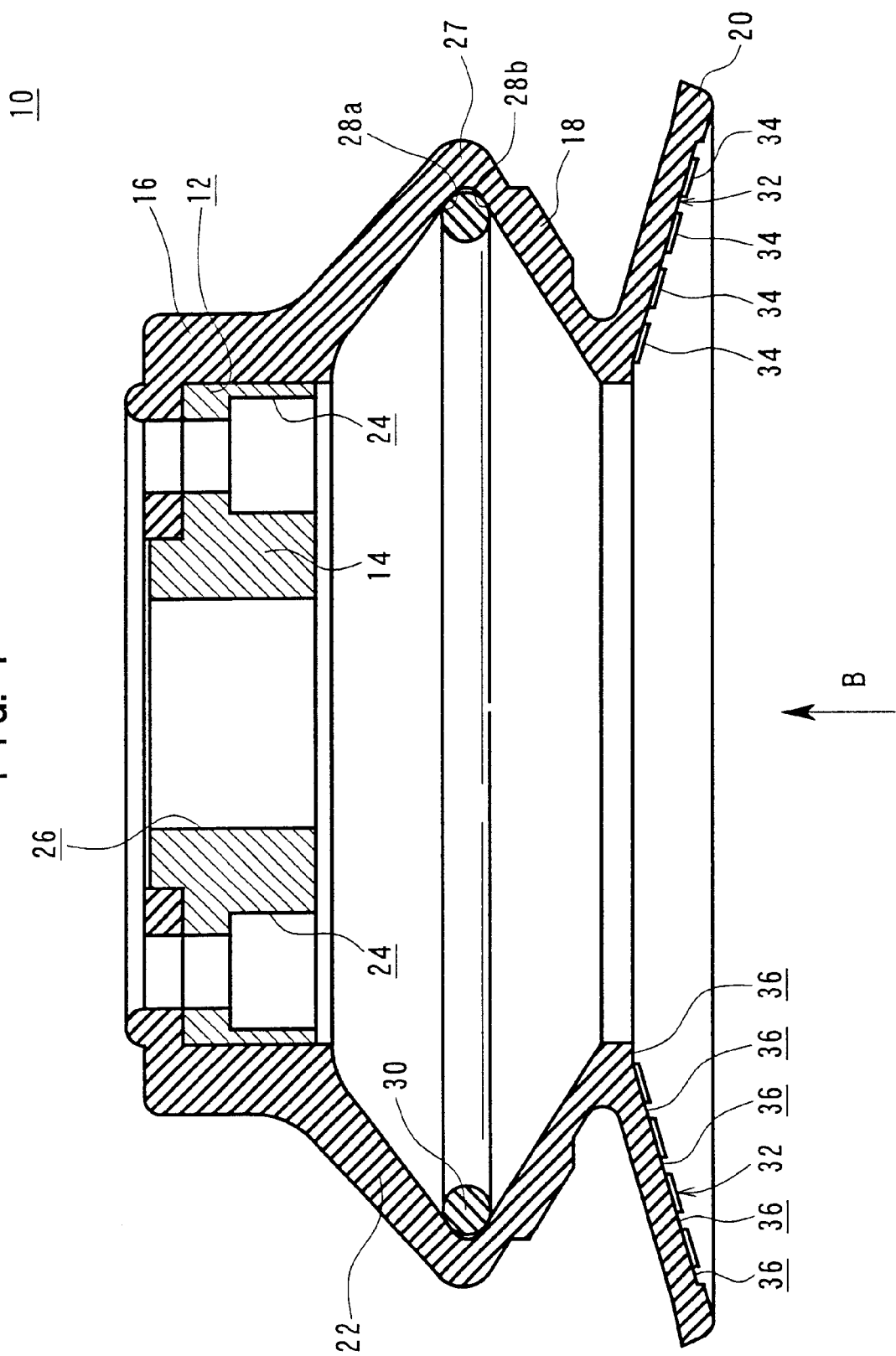
FIG. 1 shows a vertical sectional view illustrating a suction pad according to an embodiment of the present invention.
Figure 5:
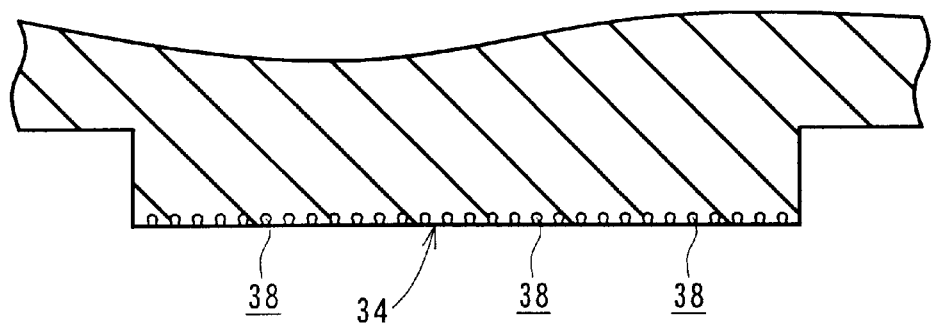
Figure 6:
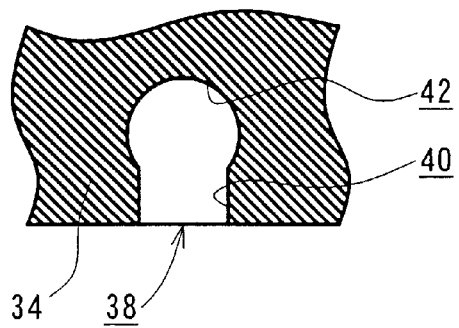
Figure 7:
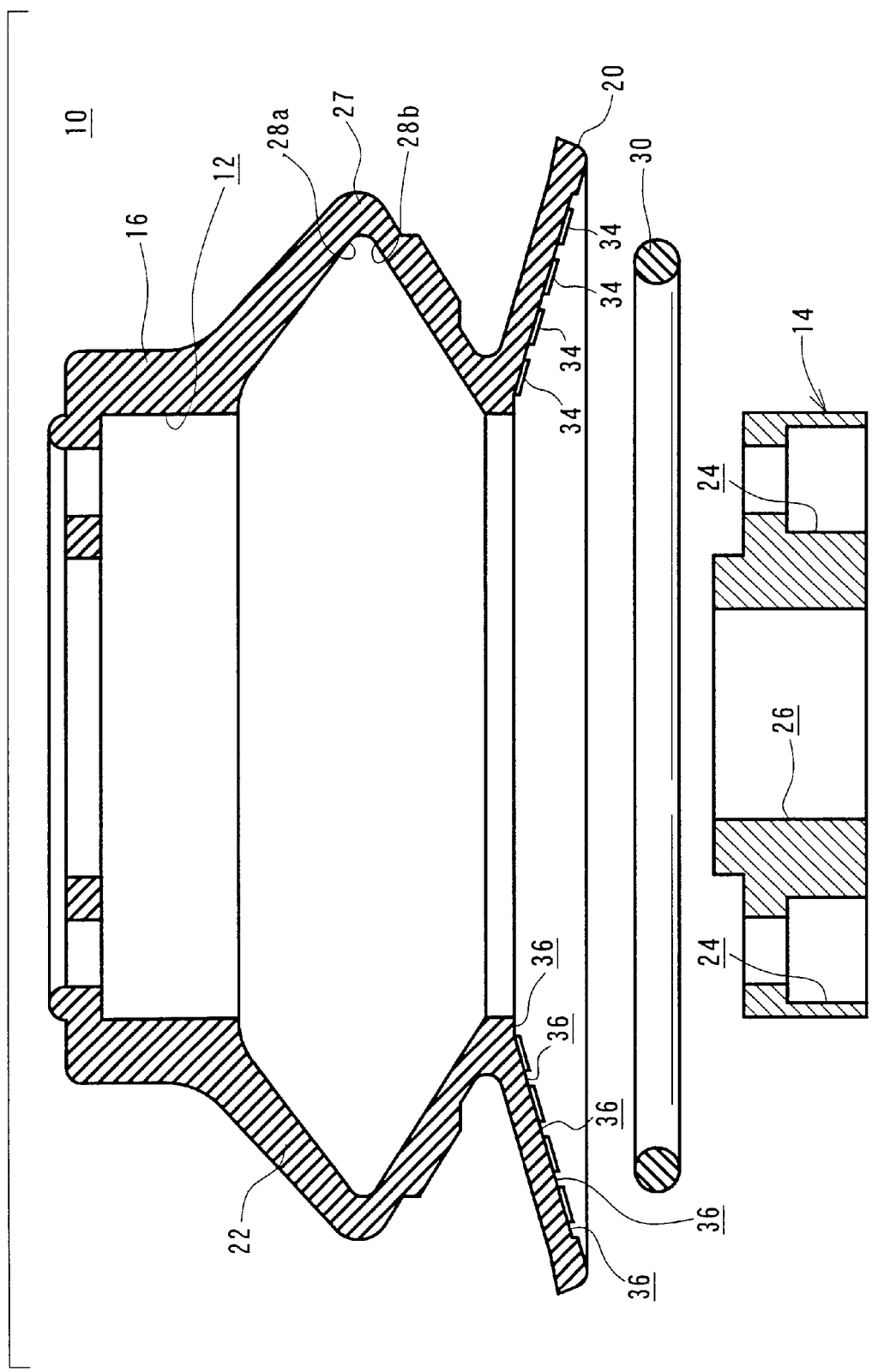
Figure 8:
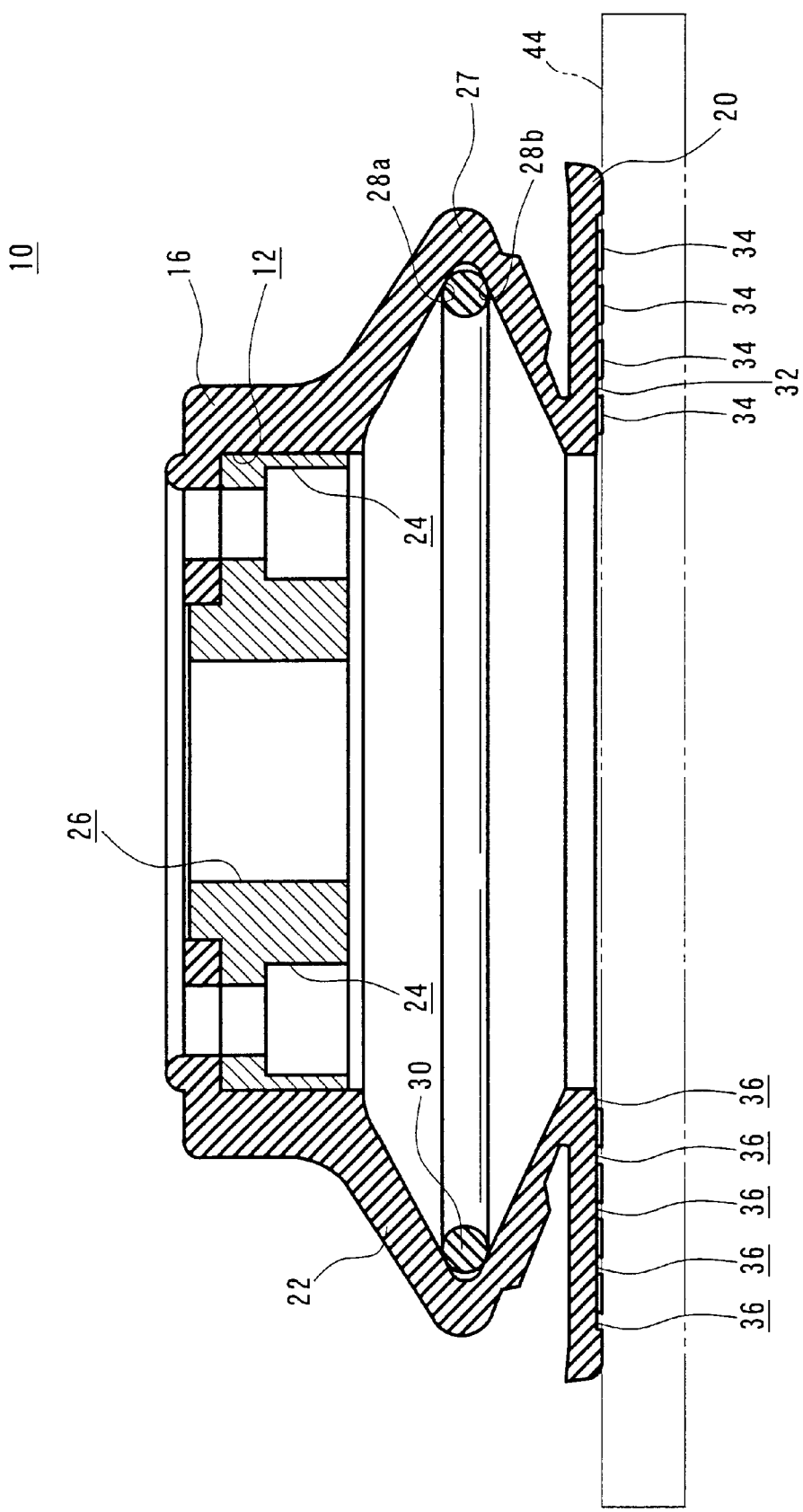
Figure 9:
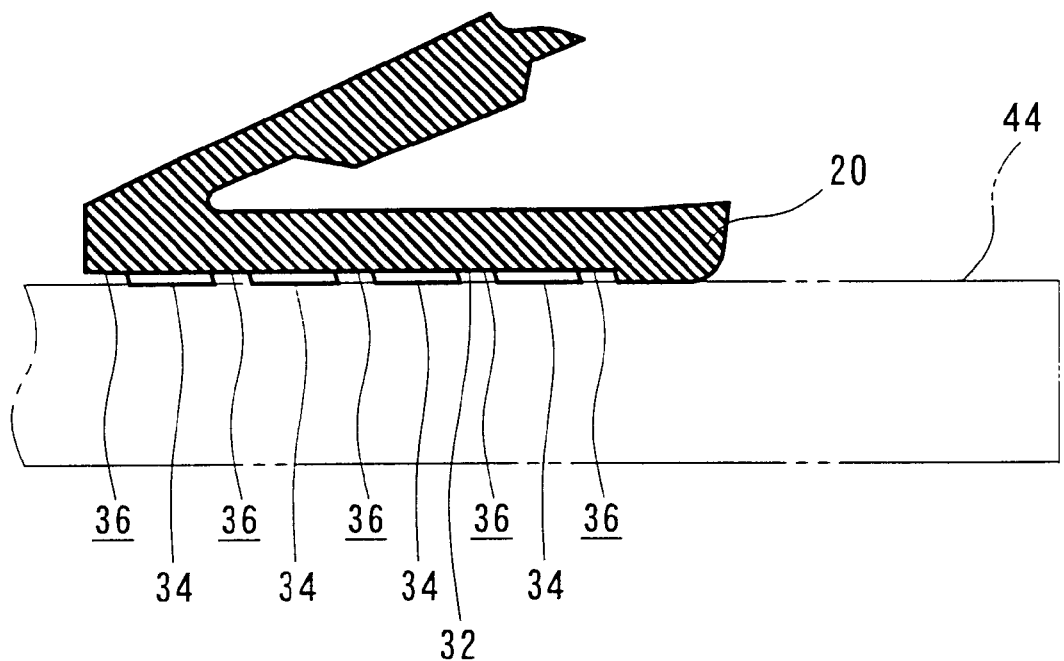
Figure 10:
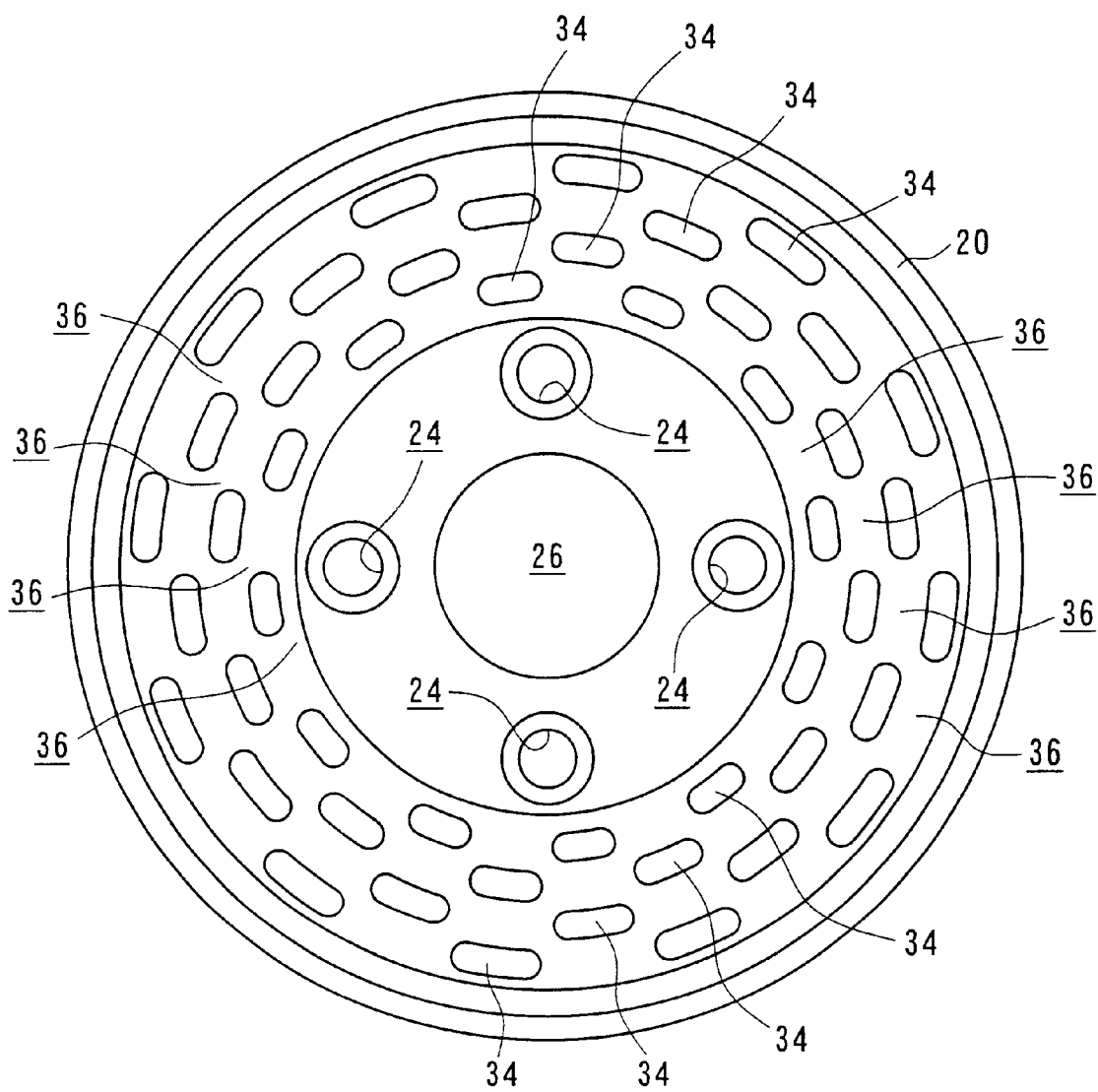
Figure 11:
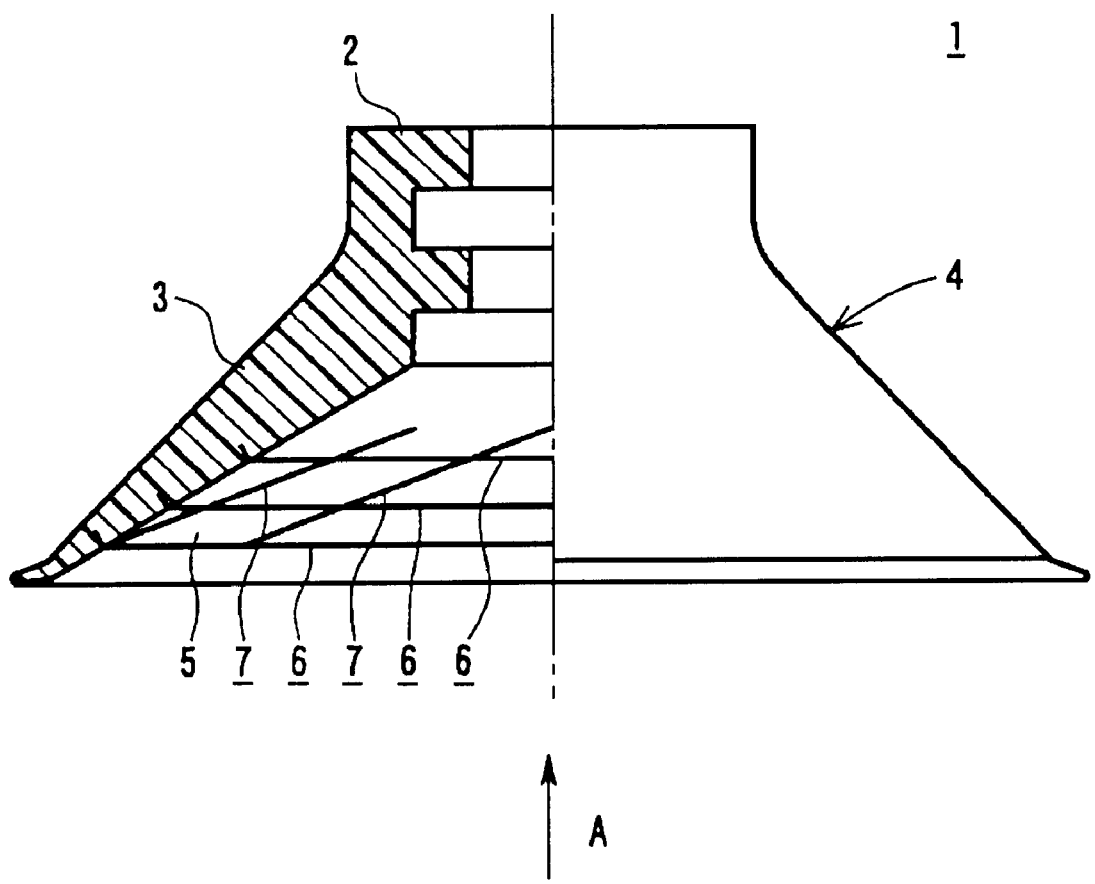
Figure 12:
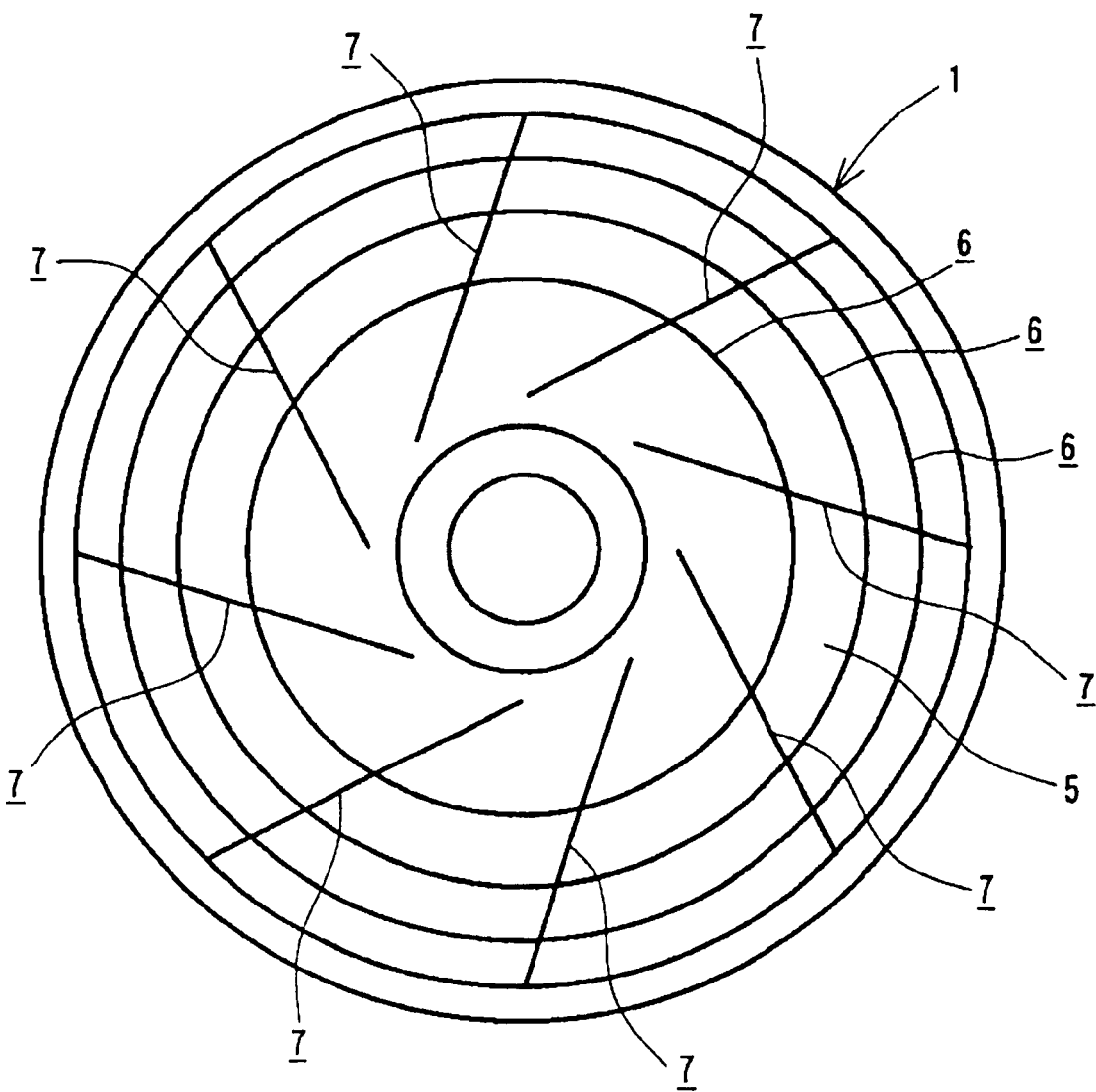

FIG. 5 shows a magnified vertical sectional view illustrating the projection;

FIG. 6 shows a magnified vertical sectional view illustrating a small hole formed in the projection;

FIG. 7 shows an exploded vertical sectional view illustrating the suction pad shown in FIG. 1;

FIG. 8 shows a vertical sectional view illustrating the operation in a state in which a workpiece is attracted;

FIG. 9 shows a magnified vertical sectional view partially illustrating the attracting surface of the skirt section shown in FIG. 8;

FIG. 10 shows a bottom view illustrating a skirt section according to another embodiment;

FIG. 11 shows a partial vertical sectional view illustrating a conventional vacuum cup; and FIG. 12 shows a bottom view. illustrating a skirt section as viewed in a direction indicated by an arrow A shown in FIG. 11.

DESCRIPTION OF THE PREFERRED EMBODIMENTS

In FIG. 1, reference numeral 10 indicates a suction pad according to an embodiment of the present invention.

The suction pad 10 comprises a proximal section 16 and a skirt section 22. The proximal section 16 has a hole 12 formed therein to install a connector 14 of a substantially disk shape. The skirt section 22 has a bellows section 18 continued to the proximal section 16 and an outer circumferential edge section 20 formed under the bellows section 18. The proximal section 16 and the skirt section 22 are integrally formed with a flexible material such as rubber.

Four attachment holes 24 to insert unillustrated bolts are arranged in the connector 14 and the proximal section 16. The attachment holes 24 are separated from each other by about 90 degrees in a circumferential direction of the skirt section 22 (see FIG. 2). The connector 14 has a negative pressure supply port 26 provided at a center thereof. The negative pressure fluid is supplied via an unillustrated tube communicating with a negative pressure supply source to the negative pressure supply port 26. The connector 14 is preferably formed of a metal material such as an aluminum or the like.

The skirt section 22 of a bellow shape has an O-ring 30 installed to a bent section 27 thereof. If a workpiece is attracted as described later on, the O-ring 30 is elastically deformed for preventing inner wall surfaces 28a, 28b of the bent section 27 from adhering to one another.

The O-ring 30 is preferably formed of fluorine rubber or the like.

Figure 2:
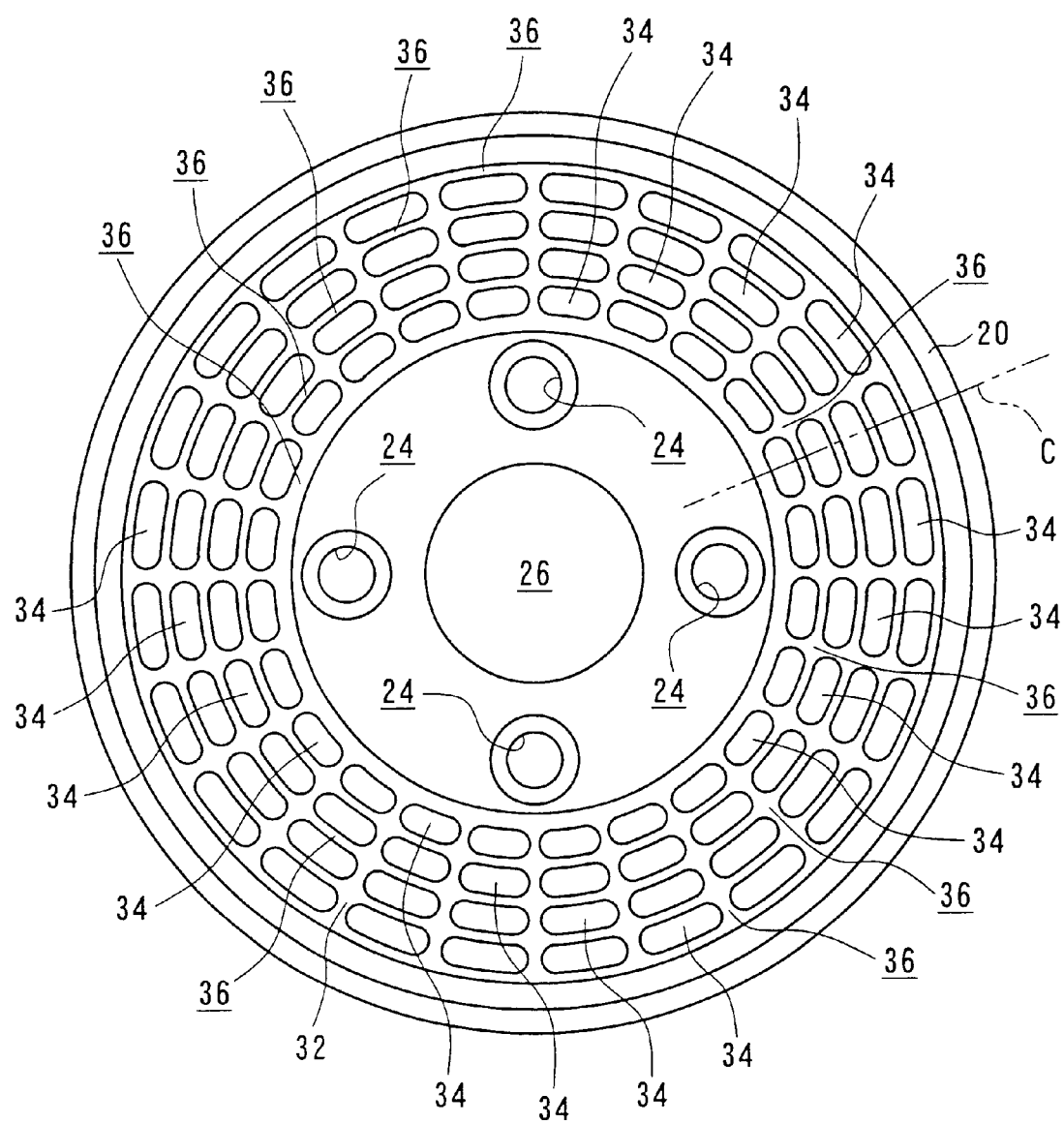
FIG. 2 shows a bottom view illustrating a skirt section as viewed in a direction indicated by an arrow B.
Figure 3:
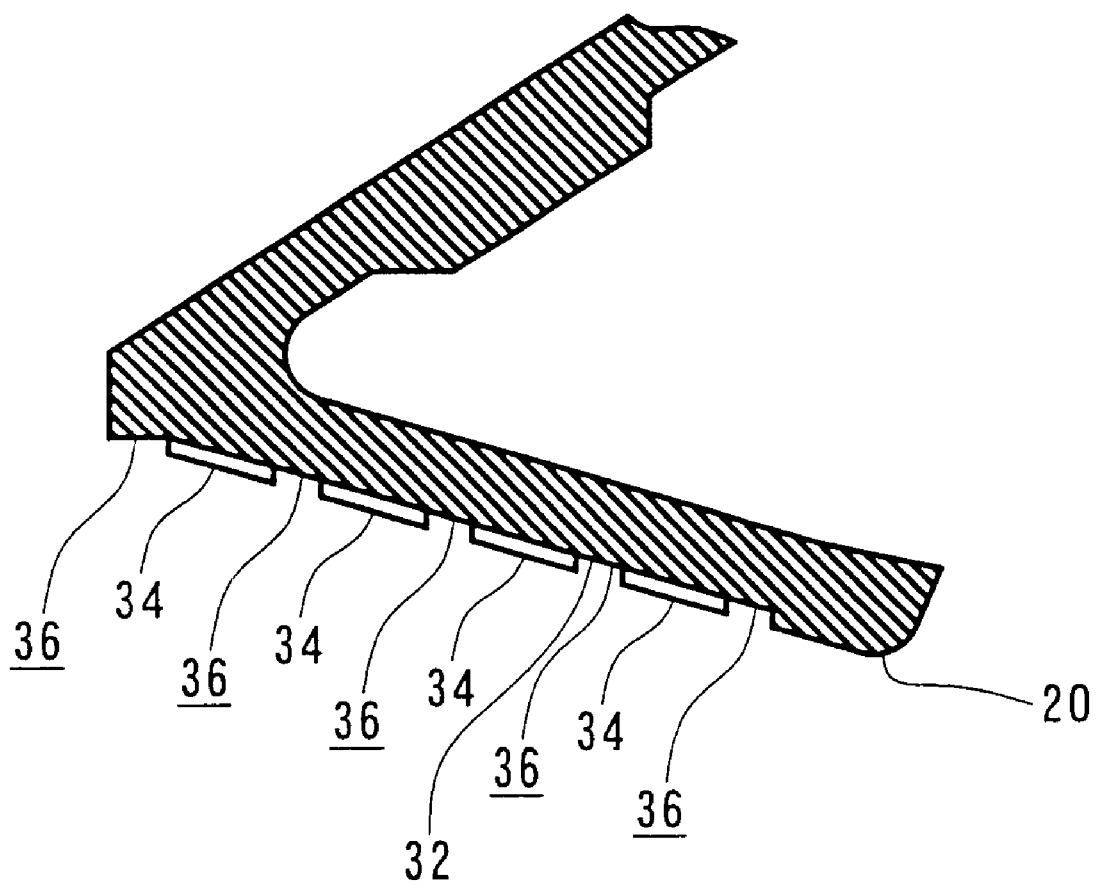
FIG. 3 shows, with partial omission, a magnified sectional view illustrating an attracting surface of the skirt section.

As shown in FIG. 2, the skirt section 22 has a plurality of projections 34 arranged on an attracting surface 32 thereof. The respective projections 34 are substantially elliptic and are separated from each other by predetermined spacing distances in the circumferential direction. Further, the projections 34 are arranged linearly in a radial direction of the skirt section 22 (see an imaginary line C) while being separated from each other by predetermined spacing distances. In this embodiment, the plurality of projections 34 are arranged on four substantially concentric circles. Further, the lengths of the projections 34 along the circumferential direction are gradually increased radially outwardly from the vicinity of the center of the skirt section 22.

Figure 4:
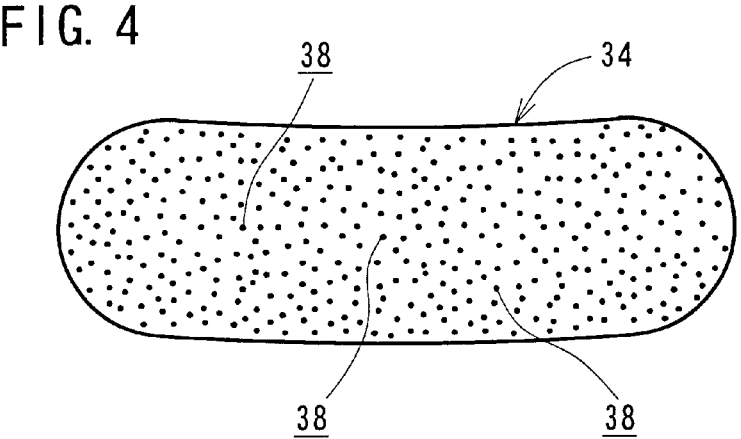
FIG. 4 shows a magnified plan view illustrating a projection formed on the attracting surface.

The skirt section 22 has a recessed portion 36 formed on the attracting surface 32 thereof. All portions of the recessed portion 36 enable a fluid under the negative pressure to be supplied to the entire attracting surface 32 except for the plurality of substantially elliptic projections 34. The entire recessed portion 36 constitutes an acting surface under the negative pressure if the workpiece is attracted. As shown in FIG. 4, the projection 34 has a large number of small holes 38 irregularly arranged on an upper surface thereof. As shown in FIGS. 5 and 6, the projection 34 is not penetrated and the small holes 38 are closed at an upper layer of the projection 34. The small hole 38 comprises a cylindrical section 40 whose diameter is substantially identical, and a spherical section 42 of a substantially spherical shape. The large number of the small holes 38 can absorb into the holes an oil component or the like existing between the a surface of the rubber and a surface of the workpiece. The large number of the small holes 38 quickly removes the oil component or the like existing between the surface of the rubber and the surface of the workpiece.

The suction pad 10 according to the embodiment of the present invention is basically constructed as described above. Its operation, function, and effect will now be explained.

At first, the suction pad 10 is installed to an arm or the like of an unillustrated robot so as to displace the suction pad 10 in directions of three axes of mutually orthogonal X, Y, and Z. Further, a tube passage such as a tube is connected to the negative pressure supply port 26 to make further connection to the negative pressure supply source.

Next, the suction pad 10 is displaced by an operation of the arm of the unillustrated robot to attract the workpiece 44 with the attracting surface 32 of the skirt section 22. In other words, when the outer circumferential edge section 20 of the skirt section 22 abuts against the workpiece 44, the skirt section 22 conforms to a shape of the workpiece 44 and a space under the negative pressure is formed. The fluid under the negative pressure is supplied in the space under the negative pressure via the negative pressure supply port 26 to attract the workpiece 44 under the action of the negative pressure of the fluid (see FIG. 8).

The skirt section 22 of the bellow shape is then elastically deformed. The attracting surface 32 of the skirt section 22 is pressed against the workpiece 44 (see FIG. 9). Thus, the entirety of the recessed portion 36 except for the projections 34 functions as the acting surface under the negative pressure in the skirt section 22 tightly contacting with the workpiece 44. Accordingly, an area of the acting surface under the negative pressure is increased in comparison with the conventional technique, thereby making it possible to further increase the attracting force under the negative pressure against the workpiece 44.

If the oil film or the water droplet adheres to the attracted surface of the workpiece 44 of a plate shape such as a steel plate or a glass plate, the oil film or the water droplet intervening between the attracting surface 32 of the skirt section 22 and the surface of the workpiece 44 is wiped and flown into the recessed portion 36 by the projections 34 formed on the attracting surface 32 of the skirt section 22. After flown into the recessed portion 36, the oil film or the water droplet is sucked by the recessed portion 36 which enables the fluid under the negative pressure to be supplied and the negative pressure supply port 26, thereby being discharged out of the suction pad 10. In other words, the oil film or the water droplet intervening between the attracting surface 32 of the skirt section 22 and the surface of the workpiece 44 is removed via the recessed portion 36 functioning as an escape route.

Accordingly, even if the oil film or the water droplet adheres to the attracted surface of the workpiece 44, a contacting degree of the attracting surface 32 of the skirt section 22 with the workpiece 44 is increased to improve a force resistive against a slip. As a result, a force frictional against the slip is improved by the projections 34 formed on the attracting surface 32 of the skirt section 22. The attracted workpiece 44 can be reliably held against falling and being out of position without causing the slip by the attracting surface 32 of the skirt section 22.

A preferable ratio of the projections 34 is set to be within a range of about 20% to about 60% in the attracting surface 32 of the skirt section 22.

In the embodiment of the present invention, as shown in FIG. 7, it is possible to separate from each other the main pad body which is composed of the proximal section 16 and the skirt section 22 and which is formed of the rubber material, the connector 14 which is composed of the metal material, and the O-ring 30 which is formed of the rubber material. These components can be recycled after they are classified based upon constitutive materials thereof.

Further, in the embodiment of the present invention, the workpiece 44 can be favorably attracted under the elastically deforming action of the bellows section 18 provided for the skirt section 22 even if the attracted surface of the workpiece 44 is inclined or curved.

Further, in the embodiment of the present invention, the O-ring 30 installed to the bent section 27 of the skirt section 22 can reliably prevent the inner wall surfaces 28a, 28b of the bent section 27 from adhering to each other due to an oily component and from failing to restore original shapes thereof with an inexpensive structure. The O-ring coated with Teflon (registered trademark) can preferably improve a property of restoring the original shape of the bent section 27.

Further, as shown in FIG. 10, the projections 34 may be alternately arranged with respect to the adjoining projections 34 along the radial direction, instead of linearly arranging the plurality of projections 34 disposed on the concentric circles along the radial direction. This alternate arrangement is possible by deviating phases of the projections 34 by a predetermined angle along the circumferential direction with respect to the projections 34 disposed on another adjoining concentric circle. This arrangement makes it possible to decrease the number of the projections 34 and to increase the area of the acting surface of the entire recessed portion 36 under the negative pressure.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A suction pad capable of attracting and transporting a workpiece, said suction pad comprising:

a proximal section for connection to a negative pressure supply source;

a skirt section contacting with said workpiece to form a space under a negative pressure, wherein said skirt section has a bellows section which has a cross section of a substantially wave shape comprising a bent section and an attracting section flexibly attached to said bent section, said attracting section having an attracting surface; and a circumferential edge section formed on an outer periphery of said attracting section, wherein said attracting section has a plurality of projections separated from each other by predetermined spacing distances and a recessed portion which are formed on said attracting surface thereof, wherein said circumferential edge section and said projections have a substantially constant height with respect to said recessed portion and said recessed portion has a substantially constant depth with respect to surfaces of said projections, said recessed portion enabling a fluid under the negative pressure to be supplied to the entirety of said attracting surface except for said projections and said circumferential edge section.

2. The suction pad according to claim 1, wherein said plurality of projections are substantially elliptic and are separated from each other by predetermined spacing distances on concentric circles along a circumferential direction of said skirt section.

3. The suction pad according to claim 2, wherein each of said plurality of projections on said concentric circles respectively is arranged linearly with respect to adjoining one of said projections on said concentric circles along a radial direction of said skirt section.

4. The suction pad according to claim 2, wherein a phase of each of said plurality of projections on said concentric circles is deviated by a predetermined angle with respect to one of said projections on adjoining concentric circles along said circumferential direction.

5. The suction pad according to claim 2, wherein said projections have a plurality of small holes formed on said surfaces thereof, said small holes being closed in the vicinity of said surfaces of said projections without penetration.

6. The suction pad according to claim 1, wherein said bellows section has a ring member installed to an inner wall surface of said bent section thereof.

* * * * *